(12) United States Patent
Riswick et al.

(10) Patent No.: US 10,723,496 B2
(45) Date of Patent: Jul. 28, 2020

(54) CONTAINER CLOSING AND OPENING ARTICLE, SYSTEM, AND METHOD

(71) Applicant: H.B. Fuller Company, St. Paul, MN (US)

(72) Inventors: Matheus W. Riswick, Hollandsche Rading (NL); Aleksey V. Kurdyumov, Lino Lakes, MN (US); Jorge A. Nash, Vancouver, MN (US); Len Stredder, Newport (GB)

(73) Assignee: H.B Fuller Company, St. Paul, MN (US)

( * ) Notice: Subject to any disclaimer, the term of this patent is extended or adjusted under 35 U.S.C. 154(b) by 0 days.

(21) Appl. No.: 16/020,486

(22) Filed: Jun. 27, 2018

(65) Prior Publication Data

US 2019/0002144 A1    Jan. 3, 2019

Related U.S. Application Data

(60) Provisional application No. 62/527,328, filed on Jun. 30, 2017.

(51) Int. Cl.
*B65B 51/06* (2006.01)
*B65D 5/54* (2006.01)
(Continued)

(52) U.S. Cl.
CPC ............ *B65B 51/067* (2013.01); *B31B 50/72* (2017.08); *B31B 50/722* (2017.08); *B65B 7/20* (2013.01);
(Continued)

(58) Field of Classification Search
CPC ......... B65B 51/067; B65B 7/20; B31B 50/72; B31B 50/722; C09J 7/35; C09J 7/32;
(Continued)

(56) References Cited

U.S. PATENT DOCUMENTS 2,120,629 A    6/1938   Schunemann
2,895,865 A    7/1959   Humphner
(Continued)

OTHER PUBLICATIONS http://www.proshipinc.com/solutions/cvp-500-automated-packing-solution. Website stated Publication date, Mar. 31, 2017.
(Continued)

*Primary Examiner* — Christopher R Demeree
(74) *Attorney, Agent, or Firm* — Kristen Stone; Daniel J. Barta

(57) ABSTRACT

Methods, articles, and apparatus that provide a dual function closure/opening system that utilizes a tape serving as both a sealing closure and as an opening mechanism. For example, in one embodiment, a single adhesive tape is introduced between a container flap and a container panel and then the container flap and the container panel are pressed together forming a bond between the flap and the panel via the adhesive tape thereby closing the container. In another embodiment, one end of a container includes two overlapping flaps and a single adhesive tape is introduced between the overlap of the two container flaps and then the container flaps are pressed together forming a bond between the flaps via the adhesive tape thereby closing the container. The methods and apparatus disclosed herein are directed to any container with at least one flap that overlaps a side panel of the container or that overlaps another flap.

20 Claims, 14 Drawing Sheets

(51) Int. Cl.
*B65D 5/02* (2006.01)
*C09J 7/32* (2018.01)
*B31B 50/72* (2017.01)
*C09J 7/35* (2018.01)
*B65B 7/20* (2006.01)

(52) U.S. Cl.
CPC .......... *B65D 5/0236* (2013.01); *B65D 5/545* (2013.01); *C09J 7/32* (2018.01); *C09J 7/35* (2018.01); *C09J 2201/128* (2013.01)

(58) Field of Classification Search
CPC .......... C09J 5/06; B65D 5/0236; B65D 5/545; B65D 2313/08
USPC .......... 229/100, 238, 206, 125.39, 132, 181, 229/245; 428/346, 347; 156/306.6, 155, 156/320, 322; 427/207.1, 211
See application file for complete search history.

(56) References Cited

U.S. PATENT DOCUMENTS

| | | | |
|---|---|---|---|
| 2,909,312 A | 10/1959 | Conerty | |
| 3,217,969 A | 11/1965 | Schmit-Ohlhoff | |
| 3,263,900 A | 8/1966 | Link et al. | |
| 2,769,666 A | 10/1966 | Johnson | |
| 3,276,665 A | 10/1966 | Rasmussen | |
| 3,388,639 A | 6/1968 | Rumberger | |
| 3,616,990 A | 11/1971 | Powell | |
| 3,663,269 A * | 5/1972 | Fischer | B05C 1/083 428/346 |
| 3,727,750 A | 4/1973 | Petter | |
| 3,808,073 A * | 4/1974 | Navarre | B29C 65/02 156/64 |
| 3,850,363 A | 11/1974 | Jacobs | |
| 3,853,261 A | 12/1974 | Moore | |
| 3,884,348 A | 5/1975 | Ross | |
| 4,351,877 A | 9/1982 | Williams | |
| 4,621,736 A | 11/1986 | Roccaforte | |
| 4,773,541 A | 9/1988 | Riddell | |
| 4,778,059 A | 10/1988 | Martin et al. | |
| 4,784,271 A | 11/1988 | Wosaba et al. | |
| 4,795,035 A | 1/1989 | Kim | |
| 4,819,807 A | 4/1989 | Giger | |
| 5,035,328 A | 7/1991 | Kim | |
| 5,050,741 A | 9/1991 | Kim | |
| 5,098,757 A | 3/1992 | Steel | |
| 5,135,790 A | 8/1992 | Kaplan et al. | |
| 5,143,281 A * | 9/1992 | Mainz | B65D 5/061 229/132 |
| 5,203,634 A | 4/1993 | Kim | |
| 5,464,151 A | 11/1995 | Parker et al. | |
| 5,893,514 A | 4/1999 | Fletcher et al. | |
| 6,689,244 B2 | 2/2004 | Schwertfeger | |
| 6,713,174 B2 | 3/2004 | Mitchell | |
| 6,991,838 B2 * | 1/2006 | Schwertfeger | B65D 5/0236 428/40.1 |
| 7,731,425 B2 | 6/2010 | Lin et al. | |
| 8,932,725 B2 | 1/2015 | Koehn et al. | |
| 8,932,726 B2 | 1/2015 | Paolilli et al. | |
| 9,422,071 B2 | 8/2016 | Adams | |
| 9,434,496 B2 | 9/2016 | Sytema | |
| 2010/0055429 A1 | 3/2010 | Lee et al. | |
| 2012/0094042 A1 | 4/2012 | Lee et al. | |
| 2012/0251749 A1 | 10/2012 | Lee et al. | |
| 2013/0000252 A1 | 1/2013 | Pettersson et al. | |
| 2014/0065382 A1 | 3/2014 | Koehn et al. | |
| 2015/0197364 A1 | 7/2015 | Sytema | |

OTHER PUBLICATIONS https://www.youtube.com/watch?v=J01y0DMFQMo. Website stated Publication date, Dec. 9, 2015.

* cited by examiner

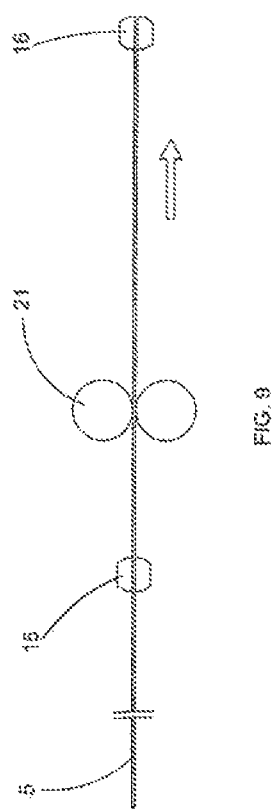

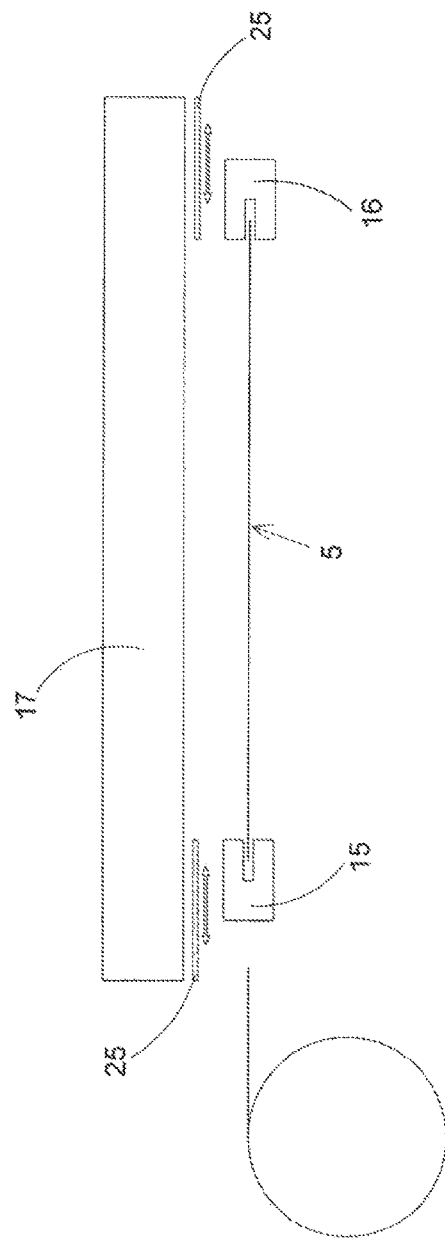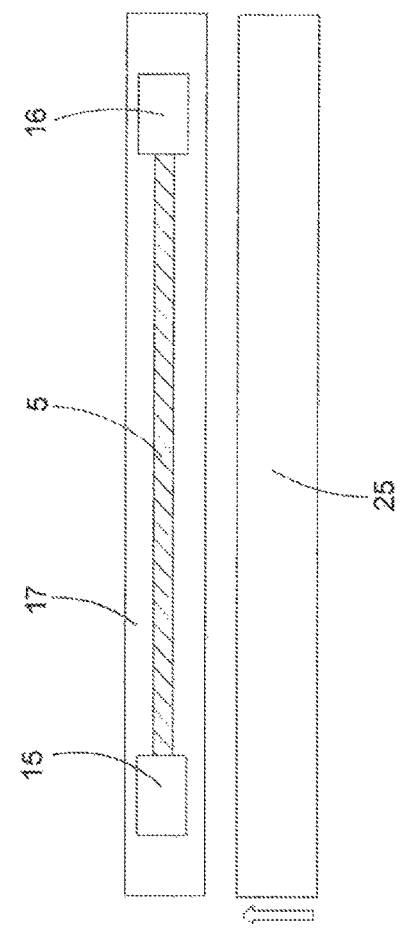

CONTAINER CLOSING AND OPENING ARTICLE, SYSTEM, AND METHOD

This application claims the benefit of U.S. Provisional Appl. No. 62/527,328, filed Jun. 30, 2017, which is incorporated herein by reference in its entirety.

BACKGROUND

Certain boxes are produced around an article of commerce on demand in an automated manner. The benefits of these boxes are that they are produced around the article to eliminate air-space, are closed without tape to provide security from tampering, and protect the article from damage. However, limitations of these containers are that they are difficult to open and the method of closure with glue is a difficult and critical application.

SUMMARY

Disclosed herein is a method for sealing a container, comprising:

(a)(1) providing an article having at least one side panel and at least one end panel, wherein there is at least one opening/closing flap contiguous with the at least one end panel;

(b)(1) activating a single tape comprising a carrier substrate having a first surface and an opposing second surface, a first activatable adhesive composition disposed on the carrier substrate first surface and a second activatable adhesive composition disposed on the carrier substrate second surface, and contacting the activated tape to a surface of the side panel or to a surface of the opening/closing flap; or (b)(2) contacting a single tape to a surface of the side panel or to a surface of the opening/closing flap, the tape comprising a carrier substrate having a first surface and an opposing second surface, a first activatable adhesive composition disposed on the carrier substrate first surface and a second activatable adhesive composition disposed on the carrier substrate second surface, and then activating the tape; and (c) contacting a surface of the side panel against a surface of the opening/closing flap so the activated tape forms a bond in a single operation between the surface of the side panel and the surface of the opening/closing flap.

Also disclosed herein is a method for sealing a container, comprising:

(a)(2) providing an article having at least one end first opening/closing flap and at least side panel, wherein there is a second opening/closing flap contiguous with the at least one side panel;

(b)(1) activating a single tape comprising a carrier substrate having a first surface and an opposing second surface, a first activatable adhesive composition disposed on the carrier substrate first surface and a second activatable adhesive composition disposed on the carrier substrate second surface, and contacting the activated tape to a surface of the second opening/closing flap; or (b)(2) contacting a single tape to a surface of the second opening/closing flap, the tape comprising a carrier substrate having a first surface and an opposing second surface, a first activatable adhesive composition disposed on the carrier substrate first surface and a second activatable adhesive composition disposed on the carrier substrate second surface, and then activating the tape; and (c) contacting a surface of the second opening/closing flap against a surface of the first opening/closing flap so the activated tape forms a bond in a single operation between the surface of the first opening/closing flap and the surface of the second opening/closing flap.

Further disclosed herein is an article comprising:

(i) at least one paper board side panel and at least one paper board end panel, wherein there is at least one paper board opening/closing flap contiguous with the at least one end panel or (ii) at least one end first opening/closing flap and at least one side panel, wherein there is a second opening/closing flap contiguous with the at least one side panel; and a single tape comprising a carrier substrate having a first surface and an opposing second surface, a first activated adhesive composition disposed on the carrier substrate first surface and a second activated adhesive composition disposed on the carrier substrate second surface, wherein the tape is positioned between (i) the at least one side panel and the opening/closing flap such that the first activated adhesive composition is adhesively secured to the at least one side panel and the second activated adhesive composition is adhesively secured to the folded opening/closing flap so as to form a seal between the side panel and the opening/closing flap or (ii) the first opening/closing flap and the second opening/closing flap such that the first activated adhesive composition is adhesively secured to the at first opening/closing flap and the second activated adhesive composition is adhesively secured to the folded second opening/closing flap so as to form a seal between the first opening/closing flap and the second opening/closing flap, and wherein (i) the set bond strength of the first adhesive composition to the at least one side panel does not substantially exceed the strength of the internal bond strength of the paper board of the at least one side panel or (ii) the set bond strength of the first adhesive composition to the second opening/closing flap does not substantially exceed the strength of the internal bond strength of the paper board of the second opening/closing flap.

Also disclosed herein is a system comprising:

a tape dispensing source;

a moveable first retainer positioned to receive tape from the dispensing source:

a moveable second retainer aligned with the first retainer for receiving tape from the first retainer; and a tape activation source configured so that the first retainer and the second retainer can be positioned proximate to the tape activation source, wherein the first retainer and the second retainer are located relative to an article that includes at least one side panel and at least one end panel, and wherein there is at least one opening/closing flap contiguous with the at least one end panel so that an activated tape held by the first retainer and the second retainer can be applied to the at least one side panel or to the at least one opening/closing flap, or wherein the first retainer and the second retainer are located relative to an article that includes at least one end first opening/closing flap and at least one side panel, wherein there is a second opening/closing flap contiguous with the at least one side panel so that an activated tape held by the first retainer and the second retainer can be applied to the first opening/closing flap or to the second opening/closing flap.

The foregoing will become more apparent from the following detailed description, which proceeds with reference to the accompanying figures.

BRIEF DESCRIPTION OF THE DRAWINGS

FIG. 9 is a schematic view of an embodiment that includes a moisture activation source.

FIGS. 10A and 10B are cross sectional views of embodiments that include a shutter that can be interposed between the activation source and the tape and/or tape retainers.

DETAILED DESCRIPTION

Figure 1:
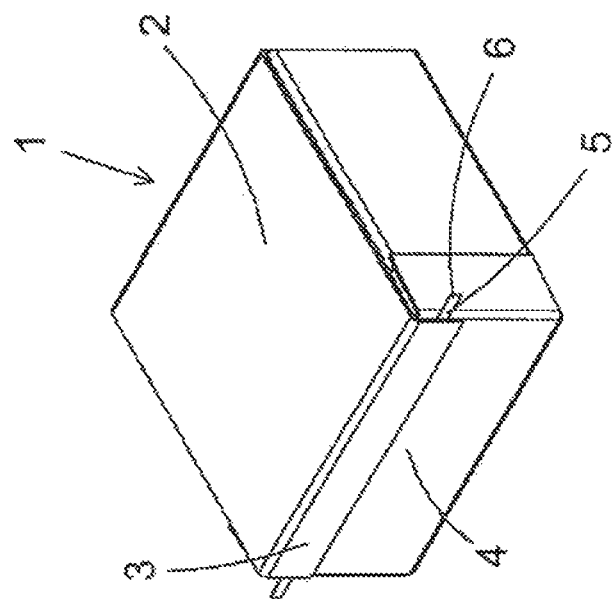
FIG. 1 is a perspective view of an embodiment of a container with a dual function closing/opening tape contacting a surface of one panel of the container.

Disclosed herein are methods, articles, and apparatus that provide a dual function closure/opening system. The tape disclosed herein serves as both a sealing closure and as an opening mechanism. For example, in one embodiment, a single adhesive tape is introduced between a container flap and a container panel and then the container flap and the container panel are pressed together forming a bond between the flap and the panel via the adhesive tape thereby closing the container. In another embodiment, one end of a container includes two overlapping flaps and a single adhesive tape is introduced between the overlap of the two container flaps and then the container flaps are pressed together forming a bond between the flaps via the adhesive tape thereby closing the container. As is evident from above, the methods and apparatus disclosed herein are directed to any container with at least one flap that overlaps a side panel of the container or that overlaps another flap.

In both embodiments, the container can be opened by pulling on the adhesive tape or on an opening tab associated with the tape. In certain embodiments, removal of the adhesive tape when opening the container does not cause substantial structural damage to the container side panel (or inner flap in the two overlapping flaps embodiment) to which the tape is adhered. For example, removal of the adhesive tape when opening the container does not cause the tape to tear an open rift in the container side panel.

In certain embodiments, the adhesive tape can tear through the outside flap but does not cause substantial structural damage to the container side panel (or inner flap in the two overlapping flaps embodiment) to which the tape is adhered. For example, removal of the adhesive tape when opening the container does not cause the tape to tear an open rift in the container side panel. Tearing of the tape through the outside flap is a function of the strength of the tape substrate.

The container may be made from any material such as, for example, paper board, paper, plastic or a combination thereof. In certain embodiments, the container includes at least one side panel or portion, at least one end panel or portion, and at least one overlapping flap. The container has an interior volume defined by inside surfaces of side, end and flap. The side, end and/or flap also have an external surface facing away from the interior volume of the container.

In certain embodiments, the container is a paper board container that includes at least one paper board side panel or portion, at least one paper board end panel or portion, and at least one paper board flap.

In certain embodiments, the set bond strength of the first adhesive composition to the inside panel or flap does not substantially exceed the strength of the internal bond strength of the corrugated board of the inside panel or flap.

In certain embodiments, the tape is applied adjacent to a perforated line in the flap and pulling on the tape detaches the flap via the perforated line. In certain embodiments, removal of the adhesive tape when opening the container does not cause substantial structural damage to the container side panel (or inner flap in the two overlapping flaps embodiment) to which the tape is adhered. For example, removal of the adhesive tape when opening the container does not cause the tape to tear an open rift in the container side panel.

In general, the tape retains its unitary structure when the tape is removed during opening of the container. However, in certain embodiments a residual amount of the adhesive composition may remain on the exterior surface of the corrugated board panel (or inner flap in the two overlapping flaps embodiment) after the tape is removed.

In certain embodiments, the tape can be applied adjacent to, a container joint (e.g., the joint formed by overlapping flaps).

In certain embodiments of the methods disclosed herein, the containers for sealing are presented in a continuous, semi-continuous, or discrete manner on an assembly line or a stand-alone machine.

The methods include activating the tape. The tape is activated at the physical space where the tape is applied to the container. For example, the tape can be activated by exposing at least one of the activatable adhesive compositions to an activation source such as a heat source or a moisture source. In certain embodiments, the heat source is a heater. Illustrative heaters include radio frequency, convection, ultrasonic, infrared, or inductive heaters. In certain embodiments, the tape can be conveyed between two fixed heated plates for activation. In certain embodiments, the moisture source is a mechanical source such as a water sprayer or a wetted roller(s) or brush(es).

In certain embodiments, the tape may be activated prior to contacting the tape to a panel or flap (e.g., a paper board panel or flap). For example, the tape is activated prior to positioning the tape into a desired location proximate to the surface of the paper board side panel or to the surface of the paper board opening/closing flap. In other embodiments, the tape may be activated after contacting the tape to a panel or flap (e.g., a paper board panel or flap). In further embodiments, the tape may be activated after it is placed between the paper board side panel and the paper board opening/closing flap or after it is placed between the paper board opening/closing flaps. Activating the adhesive composition develops green bond strength enabling initial adhesion of the tape to the container surface (e.g., a paper board surface).

After the tape has been activated, the container surface (e.g., paper board surface) having the tape disposed thereon is contacted with the other container surface (e.g., paper board surface). In certain embodiments, the two paper board surfaces with the tape interposed between the surfaces are pressed together thereby completing the bond between the surfaces, resulting in set adhesive compositions (i.e., the adhesive bond strength is fully developed) and sealing of the container.

In certain embodiments the sealing of the container is performed in a single automated operation. In other words, the steps of contacting, activating and bonding of the tape are initiated and completed within a short time period. For example, the time period may be less than 7 seconds, more particularly less than 5 seconds, and most particularly less than 3 seconds.

In certain embodiments, establishment of a sufficient adhesive bond between the tape and the exterior surface of the container side panel (or the second flap) can be determined by testing whether or not there is partial fiber pull of the paper board when the tape is removed during testing. Presence of a partial fiber pull of the paper board is indicative of sufficient adhesive strength. In certain embodiments, the sealed container is subjected to a prolonged period of heat to observe whether or not the container opens (e.g., via adhesive failure). For example, the sealed container may be placed in an oven for a certain number of days (e.g., at least three, four or five days) at a temperature (e.g, at least 40° C., more particularly at least 50° C., and most particularly at least 60° C.) elevated above room temperature.

The tape includes a carrier substrate having a first surface and an opposing second surface. The carrier substrate can be film, fiber, paper or a combination thereof. The tape substrate may be in the form of a woven or nonwoven web, a film (including a fiber reinforced film), a multifilament yarn, a monofilament, a cellulosic substrate, or any combination thereof. The web, film or fiber may comprise polyester, polypropylene, polyethylene, polyamide (e.g., aromatic polyamide such as KEVLAR fiber from E.I. du Pont or nonaromatic polyamide such as nylon), fiberglass, natural fibers such as cotton or hemp, and/or other similar materials and combinations thereof. The substrate may be a cellulosic material selected from paper, a paper/polymeric film laminate, or a fiber-reinforced paper. The fibers of the substrate may be continuous strands (e.g., a multifilament yarn or a monofilament) unidirectionally oriented in a direction parallel to the length of the tape. In certain embodiments the fibrous material is polyester fiber. In certain embodiments, the carrier substrate is a single layer of material.

A first activatable adhesive composition is disposed on the first surface and a second activatable adhesive composition is disposed on the second surface.

In certain embodiments, the first activatable adhesive composition is disposed on the entire surface area of the first surface.

In certain embodiments, the second activatable adhesive composition is disposed on the entire surface area of the second surface.

In certain embodiments, the first activatable adhesive composition is disposed on only a portion of the surface area of the first surface. For example, the first activatable adhesive composition may disposed in a pattern or non-contiguous manner on the first surface.

In certain embodiments, the second activatable adhesive composition is disposed on only a portion of the surface area of the second surface. For example, the second activatable adhesive composition may disposed in a pattern or non-contiguous manner on the second surface.

As used herein, an activatable adhesive composition refers to an adhesive composition whose adhesive properties are activated from an externally present source such as heat or moisture. For example, activation allows a hot melt adhesive to reversibly transition from a solid inert state to a state of semi-liquidity wherein substrate penetration and bonding can occur. Activation of a hot melt adhesive involves several properties including tack, softening point, and set time. Softening point describes the temperature at which an adhesive starts to turn from solid to liquid. Tack is the temperature or temperature range an adhesive can hold a substrate in place until it sets. Set time is the amount of time from when two substrates are contacted with each other until they are bonded sufficiently. Open time is the amount of time from adhesive application onto a substrate until a point at which it will no longer produce an acceptable bond when contacted with another substrate. A "pressure sensitive adhesive" (i.e. an adhesive composition that has a loop tack value of at least 0.5 N as measured by ASTM D6195-(03) at room temperature (i.e. from about 22° C. to 25° C.)) is not an activatable adhesive. In certain embodiments, at least one, and preferably both, activatable adhesive compositions are heat-activatable.

Illustrative heat-activatable adhesive compositions include heat-activatable hot melt adhesives. Hot melt adhesives are adhesives that are applied at an elevated temperature and achieve a final state and resultant strength by cooling, as contrasted with other adhesives which are applied at room temperature and achieve the final state through evaporation of water or solvents.

There is a wide variety of ingredients that go into making a hot melt adhesive. The formulator has a wide selection of polymers and usually low-molecular weight, natural and synthetic waxes, and tackifying resins to choose from.

Useful tackifying resins include natural and modified rosins such as gum rosin, wood rosin, tall oil rosin, distilled rosin, hydrogenated rosin, dimerized rosin and polymerized rosin; rosin esters such as glycerol and pentaerythritol esters of natural and modified rosins including, e.g., glycerol esters of pale, wood rosin, glycerol esters of hydrogenated rosin, glycerol esters of polymerized rosin, pentaerythritol esters of hydrogenated rosin and phenolic-modified pentaerythritol esters of rosin; phenolic modified terpene or alpha methyl styrene resins and hydrogenated derivatives thereof; aliphatic petroleum hydrocarbon resins; aromatic petroleum hydrocarbon resins, and mixed aromatic and aliphatic hydrocarbon resins and the hydrogenated derivatives thereof; aromatic or phenol modified alicyclic petroleum hydrocarbon resins and the hydrogenated derivatives thereof; alicyclic petroleum hydrocarbon resins and the hydrogenated derivatives thereof; styrenated terpenes; phenol-formaldehyde tackifying resins and combinations thereof.

Useful waxes include paraffin waxes, Fischer-Tropsch waxes, by-product polyethylene waxes, high-density low molecular weight polyethylene waxes, propylene based waxes, microcrystalline waxes, and vegetable waxes.

In order to be converted to more useful adhesives, higher molecular weight polymers are blended therewith. Higher molecular weight polymers, which are typically blended with the natural and synthetic waxes and resins to toughen or reinforce the same, include polyamides, ethylene homopolymers, copolymers and terpolymers (e.g. copolymers of ethylene and vinyl acetate and metallocene catalyzed ethylene copolymers), polyester block polymers, styrene block copolymers (e.g. styrene-butadiene-styrene, styrene-isoprene-styrene or styrene-polyolefin-styrene), polypropylene based homopolymers, copolymers and terpolymers (e.g. atatic amorphous polypropylene and metallocene catalyzed polypropylene based homopolymers and copolymers), ethyl cellulose, acrylates and methacrylates, and polystyrene, etc, and combinations thereof.

While hot-melts are usually a blended mixture of various polymers, it should be understood that any one of the above-mentioned ingredients may be used singly or in combination depending upon the properties desired. In addition, the hot melt adhesives may contain plasticizers, pigments, dyes, UV and thermal stabilizers, fillers and antioxidants.

In certain embodiments, the adhesive compositions may include 20-50 wt. % ethylene copolymer (based on the total dry weight percentage of the adhesive composition), and a tackifying resin component selected from a group consisting of a hydrocarbon tackifying resin, a rosin ester tackifying resin and a mixture thereof. In certain embodiments, the adhesive compositions include 20-60 wt. % hydrocarbon tackifying resin/rosin ester tackifying resin, and 20-40 wt. % terpene phenolic tackifying resin or an equivalent, based on the total dry weight percentage of the adhesive composition. The compositions may also optionally include 5-40 wt. % of a wax compatible with the ethylene copolymer and 0.1-2 wt. % of a stabilizing additive.

Representative ethylene copolymers include ethylene-vinyl ester copolymers wherein the vinyl ester comonomer is typically a $C_2$-$C_6$ ester, for example, vinyl acetate, methylacrylate, methyl-methacrylate, ethylacrylate, 2-ethylhexyl acrylate, butylacrylate or acrylic acid. Typically the ester content will be about 18 to 40 wt. %, preferably about 25-35 wt. %. The melt index ("MFI") (gram flow/10 min., ASTM D 1238-82 Cond. E) will typically range between 2 and 2500, more typically 6 to 500, preferably 6-400. Suitable ethylene-vinyl ester copolymers can be either of the high or low alkyl-branch containing copolymers conventionally known in the art. Useful commercially available ethylene-vinyl ester copolymers include ESCORENE® UL 7760 (MFI=5.7, vinylacetate 26.7 wt. %) from Exxon Chemical Company, ATEVA 2810A from AT Plastics, and ELVAX 260 from DuPont. In some embodiments, an ethylene copolymer component makes up a principal part of the adhesive composition. Typically that amount will be greater than about 20 wt. %, based on the total blend weight, preferably greater than about 25 wt. %, and most preferably greater than about 40 wt. %. The amount is typically less than about 50 wt. %, preferably 45 wt. %, or lower. Thus an amount between 30 and 45 wt. % will be particularly useful.

The hydrocarbon tackifying resins and terpene phenolic tackifying resin include any of those that are compatible with EVA. Rosin esters tackifying resins may also be used. For example the $C_5/C_9$ resins, any of the $C_4$, $C_5$ and/or $C_6$, and/or terpene, containing resins that also contain a significant portion of $C_8$, $C_9$ and/or $C_{10}$ monomers, e.g., styrene or alkyl-substituted styrene monomers will be suitable. Such are available commercially as nonhydrogenated or hydrogenated hydrocarbon resins prepared by Friedel-Crafts polymerization and if hydrogenated, by conventional metal-catalyzed hydrogenation. Monomers can be provided as pure monomer streams, or pure monomer in solvent, or steam-distilled petroleum fractions, for example, heart cut distillate. Preferred tackifying resins are the aromatic modified aliphatic $C_5/C_9$, aromatic modified terpene resins or aromatic aliphatic modified terpene resins prepared with or from steam-cracked petroleum fractions and having number-average molecular weights ($M_n$) less than or equal to 900, viscosity-average molecular weights ($M_z$) less than or equal to 3000, a molecular weight distribution (MWD) less than or equal to 2.1, and an aromaticity of 10-40 wt. % aromatic monomers based on total resin number average molecular weight preferably 15-35 wt. %. Resins of similar monomers meeting these physical parameters will be also be particularly suitable. Commercially available resins that are suitable include the SYLVALITE resins of Arizona Chemical Company, particularly the rosin ester resins RE 100F resin products as well as the WESTREZ resins of MeadWestvaco, particularly the 5000 resin products. The most suitable resins have a softening point (Ring & Ball) of 50-120° C., preferably 70-105° C., and most preferably 80-105° C. Below about 50° C. softening point the resins can cause undesirable loss of heat resistance for the adhesive compositions of the invention. The hot melt adhesive compositions of the invention preferably will contain from 30-60 wt. % more preferably 35-45 wt. % tackifying resin. In certain embodiments, the hydrocarbon resin is an aliphatic-aromatic resin having from 10 to 40 wt. %, of total resin number-average molecular weight, of aromatic monomer as measured by NMR.

The compositions may also include antioxidants. The antioxidants, if used, are generally present in amounts of about 0.1 to 1.5 weight percent, preferably 0.25 to 1.0 weight percent. Such antioxidants are commercially available from Ciba-Geigy, Hawthorne, N.Y. and include Irganox® 565, 1010 and 1076 which are hindered phenols. These are primary antioxidants which act as radical scavengers and may be used alone or in combination with other antioxidants such as phosphite antioxidants like Irgafos® 168 available from Ciba-Geigy. Phosphite catalysts are considered secondary catalysts and are not generally used alone. These are primarily used as peroxide decomposers. Other available catalysts are Cyanox® LTDP available from Cytec Industries in Stamford, Conn., and Ethanox® 1330 available from Albemarle Corp. in Baton Rouge, La. Many such antioxidants are available either to be used alone or in combination with other such antioxidants. These compounds are added to the hot melts in small amounts and have no effect on other physical properties. Other compounds that could be added that also do not affect physical properties are pigments which add color, or fluorescing agents, to mention only a couple. Additives like these are known to those skilled in the art. The performance of the antioxidants may be further enhanced by utilizing, in conjunction therewith, known synergists such as, for example, thiodipropionate esters and phosphites. Distearyl thiodipropionate is particularly useful.

Depending on the contemplated end uses of the adhesives, other additives such as plasticizers, pigments, dyestuffs and fillers conventionally added to hot melt adhesives may be included. In addition, small amounts of additional tackifiers and/or waxes such as microcrystalline waxes, hydrogenated castor oil and vinyl acetate modified synthetic waxes may also be incorporated in minor amounts, i.e., up to about 10% by weight, into the formulations of the present invention.

In some embodiments, flow of the adhesive to mate with the substrate is important to adhesion. The selection of the proper tackifying resin(s) and its amount can be a factor in adhesive performance. The selection of the tackifying resin type may also dictate the color and odor characteristics of the resulting adhesive. If a fast setting adhesive is desired at least one wax is also typically used to control set speed and heat resistance. The role of the wax(es) is to increase the crystallinity and modulus of the adhesive blend. Fast set and high heat resistance are typically achieved by the most crystalline waxes with the highest melting point (synthetic waxes). Such waxes, however, may prove undesirable in other areas, however, such as adhesion and cold temperature flexibility. For this reason a variety of synthetic, microcrystalline and paraffin waxes are used for various applications.

Lower heat resistance/slower set may be achieved with lower melt point resins and less crystalline waxes. Although wax primarily will drive the set time of the adhesive, lower or higher melt point resins can modify the crystallinity of an adhesive composition and therefore also adjust set time up or down.

In certain embodiments, the tape has a tensile strength of at least 14 kg/cm of tape width, more particularly at least 23 kg/cm tape width, and most particularly at least 32 kg/cm tape width. In certain embodiments the tape has a weft strength of at least 0.5 kg, more particularly at least 2.3 kg. In certain embodiments the tape applied to a paper board substrate may have a peel strength sufficient to result in paper tear of the paper board substrate (e.g., a minimum peel strength of at least 275 g/cm). In certain embodiments, the tape may have a thickness of 75 to 430 µm, more particularly 230 to 300 µm, prior to adhesion to the paper board. In some embodiments, the tape can have a length longer than its width. In other words, the tape defines a longitudinal axis along a longitudinal direction. In specific embodiments, the width of the tape is 1 mm to 60 mm, more particularly 4 mm to 30 mm, and most particularly 6 to 11 mm.

The tape may be made by applying the adhesives in a molten state to the carrier substrate while the substrate is under tension at a controlled speed. The molten adhesive(s) are allowed to cool and set up as a solid forming a linear unitized tape. The tape production process may include any heating methods known for applying hot melt adhesives.

In certain embodiments, the activatable tape does not include a removable release liner.

In certain embodiments, the container is a paper board article that includes at least one paper board side panel and at least one paper board end panel, wherein there is at least one paper board opening/closing flap contiguous with the at least one end panel. In another embodiment, the container includes at least one paper board end panel, wherein there is a first paper board opening/closing flap contiguous with the at least one end panel and a second paper board opening/closing flap contiguous with the at least one end panel. In certain embodiments, the paper board may be a corrugated paper board. The corrugated paper board includes an exterior liner and a corrugated member. In some implementations, the corrugated paper board consists of a series of parallel flutes. However, in other implementations, the corrugated paper board can include other configurations, such as a waffle-type pattern or honeycomb. The corrugated board may be a single wall structure (i.e., includes a single fluted corrugated medium and at least one liner layer) or a multi-wall structure (i.e., includes at least two fluted corrugated mediums and at least one liner layer). In certain embodiments, the article is a box that has four side panels, a top end panel, and a bottom end panel.

Figure 2:
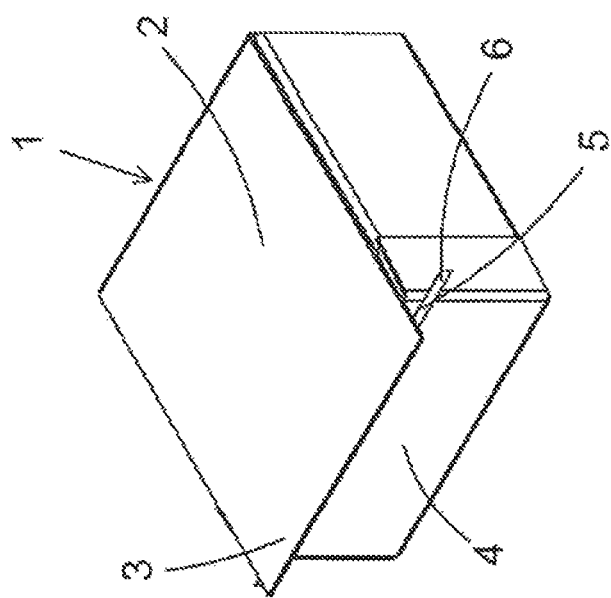
FIG. 2 is a perspective view embodiment of a container with a dual function closing/opening tape interposed between a flap of the container and a panel of the container.

An illustrative container 1 is shown in FIGS. 1 and 2. The container 1 includes a first opening/closing end 2. The opening/closing end 2 include a flap 3 that is contiguous with the end 2 and that extends beyond the edge of the container. The container 1 also includes a side panel 4. The side panel 4 adjoins the opening/closing end 2. The flap 3 can be bent to contact and overlap a top portion of the side panel 4 as shown in FIG. 2. The flap 3 also overlaps the edge created by the adjoining side panel 4 and end 2.

In FIG. 1 a dual function closing/opening tape 5 contacts the exterior surface of the side panel 4. As disclosed herein, the tape 5 is activated so that it has sufficient adhesive green strength so that it is adhesively secured to the exterior surface of the side panel 4. In FIG. 2 the flap 3 is bent over the panel so that tape 5 is interposed between the interior surface of the flap 3 and the exterior surface of panel 4. Final setting of the adhesive compositions carried on the tape seals the container 1 as shown in FIG. 2.

FIGS. 1 and 2 also show an extended end portion 6 of the tape 5 that extends beyond the outer edge of the container. The extended end portion 6 serves as an opening tab for pulling when opening the container. Alternatively, an opening tab may be provided by a tear tab formed in the paper board of the side panel or the flap. For example, the tear tab may have a flared handle portion at its tear-initiating end that enables a user to grip and pull the tear tab. The tear-initiating end of the tear tab may be located at an edge of the paper board. In certain embodiments the tear tab may be made by cutting a profile or pattern that extends through the entire thickness of the paper board and that matches the profile or pattern of the tear tab. The cut for the tear tab is made during the converting of the paper board into a container so that the cut and associated tear tab are present in the finished container made from the corrugated board.

Figure 6:
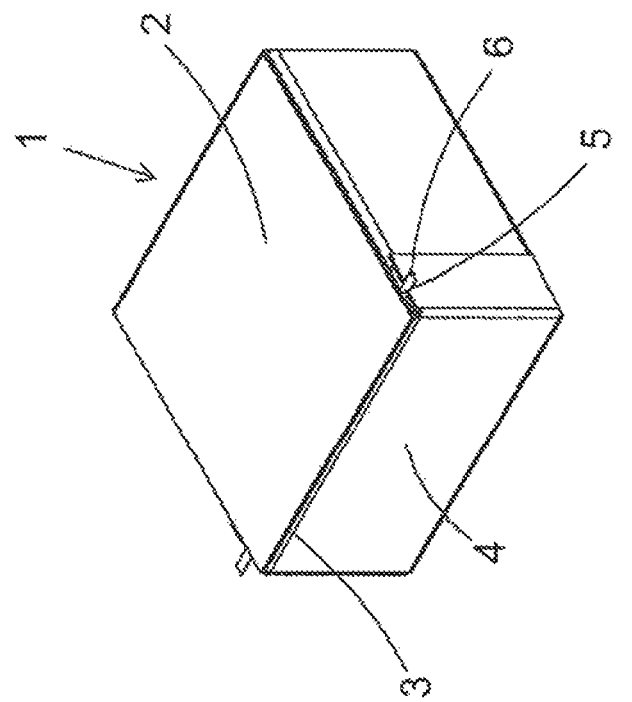
FIG. 6 is a perspective view of an embodiment of a container with a dual function closing/opening tape interposed between a first flap of the container and a second flap of the container.
Figure 5:
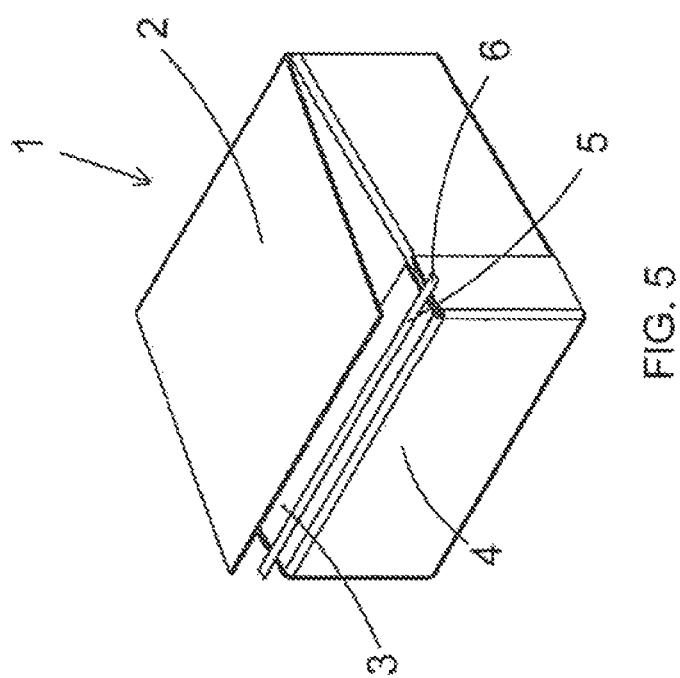
FIG. 5 is a perspective view of an embodiment of a container with a dual function closing/opening tape contacting a surface of a first flap of the container.

Another embodiment of an illustrative container is shown in FIGS. 5 and 6. In this embodiment the container 1 includes paper board end first opening/closing flap 2. The container 1 also includes a paper board side panel 4 that includes a second paper board opening/closing flap 3 contiguous with the side panel 4. The side panel flap 3 can be bent so that it is underneath the end flap 2. A portion of the end flap 2 overlaps the side panel flap 3.

In FIG. 5 a dual function closing/opening tape 5 contacts the exterior surface of the side panel flap 3. As disclosed herein, the tape 5 is activated so that it has sufficient adhesive green strength so that it is adhesively secured to the exterior surface of the side panel flap 3. In FIG. 6 the flap 3 is bent under the end flap 2 so that tape 5 is interposed between the exterior surface of the flap 3 and the interior surface of end flap 2. In certain embodiments, the edges of end flap 2 coincide with the edges of the container 1. Final setting of the adhesive compositions carried on the tape seals the container 1 as shown in FIG. 6.

Figure 3:
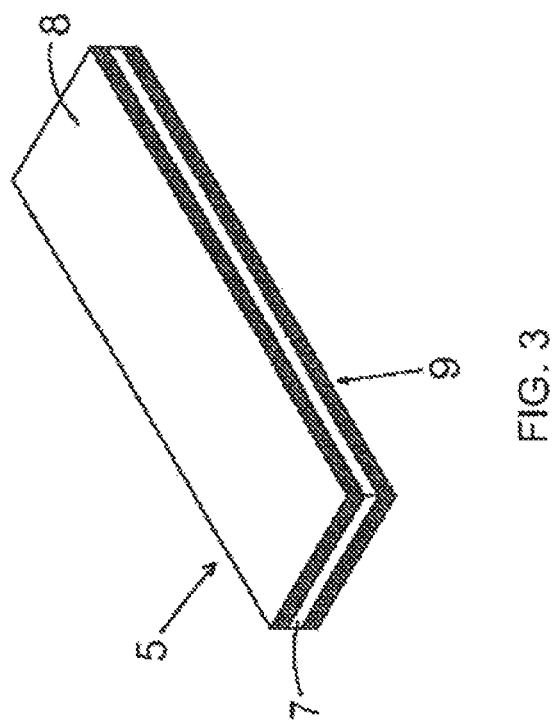
FIG. 3 is a perspective view of a dual function closing/opening tape.

An illustrative dual function closing/opening tape 5 is shown in FIG. 3. The tape 5 includes a tape substrate 7 interposed between a layer 8 of a first activatable adhesive composition and a layer 9 of a second activatable adhesive composition. The layer 8 of the first activatable adhesive composition contacts a surface of the substrate 7 and the layer 9 of a second activatable adhesive composition contacts an opposing surface of the substrate 7. The first activatable adhesive composition may have the same or different composition compared to the second activatable adhesive composition. In certain embodiments, the substrate 7 has a thickness of at least 25 µm, more particularly at least 75 µm. In certain embodiments, the substrate 7 has a thickness not greater than 127 µm, particularly 100 µm. In certain embodiments, each of the layer 8 and the layer 9 has a thickness of at least 25 µm, more particularly at least 75 µm. In certain embodiments, each of the layer 8 and the layer 9 has a thickness not greater than 150 µm, particularly 100 µm. In certain embodiments, the overall tape 5 has a thickness of at least 75 µm, more particularly at least 225 µm. In certain embodiments, the overall tape 5 has a thickness not greater than 430 µm, particularly 300 µm.

FIGS. 4A-4G illustrate one embodiment of an automated method and apparatus for sealing a container 1.

The apparatus includes a first tape retainer 15, a second tape retainer 16, and a heat activator 17. The first retainer 15 and the second retainer 16 may each be a device that can receive, retain and locate the tape 5. Illustrative retainers include an electromechanical gripper or a vacuum retainer, each of which is known in the art.

Figure 4A:
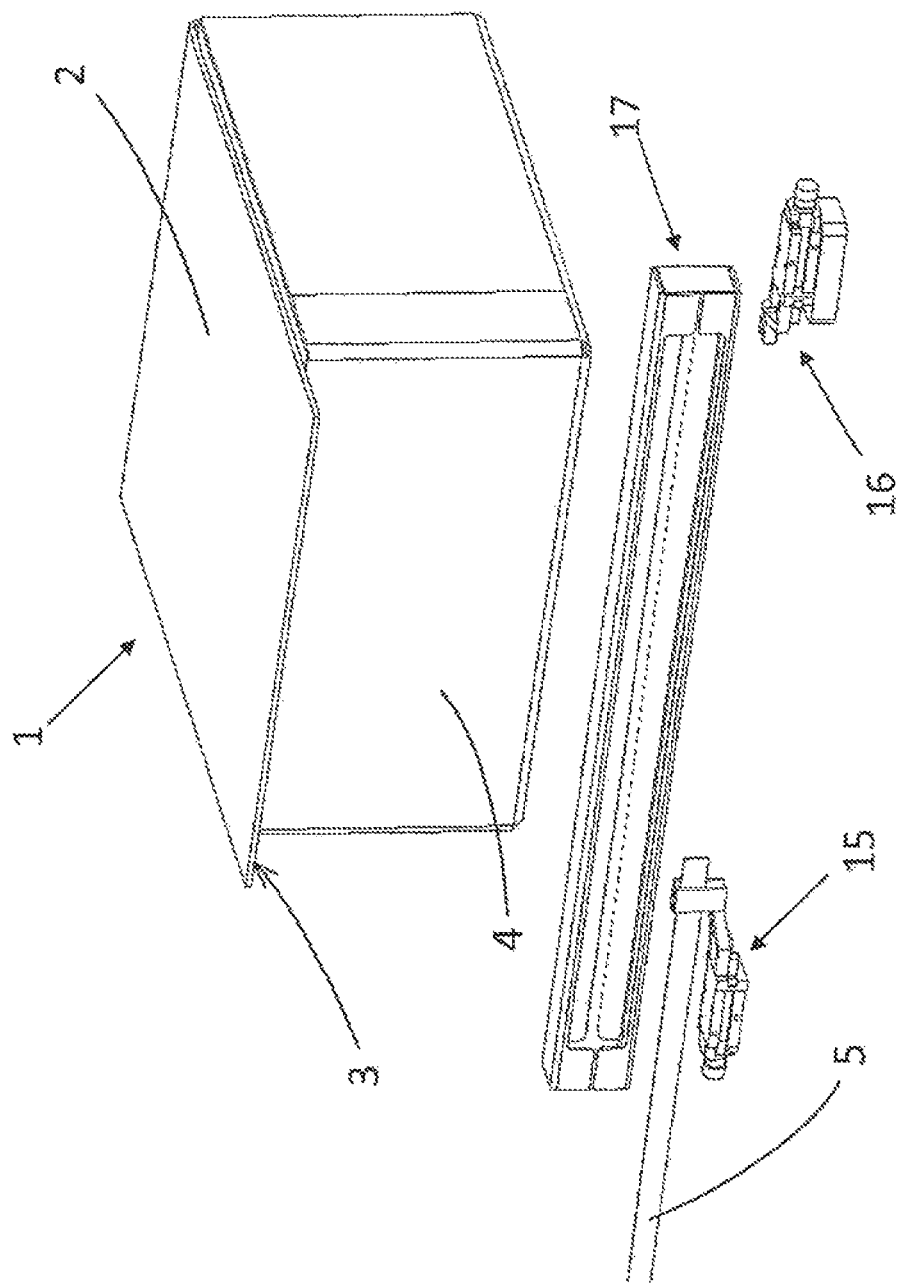
FIGS. 4A-4G illustrate a method for sealing a container as disclosed herein.

In FIG. 4A first tape retainer 15 and second tape retainer 16 are initially located below the heat activator 17. A tape 5 is fed to the first tape retainer 15 from a tape supply source (tape supply source is not shown). The tape supply source may be a wound roll of tape. The tape 5 is retained by the first tape retainer 15.

Figure 4B:
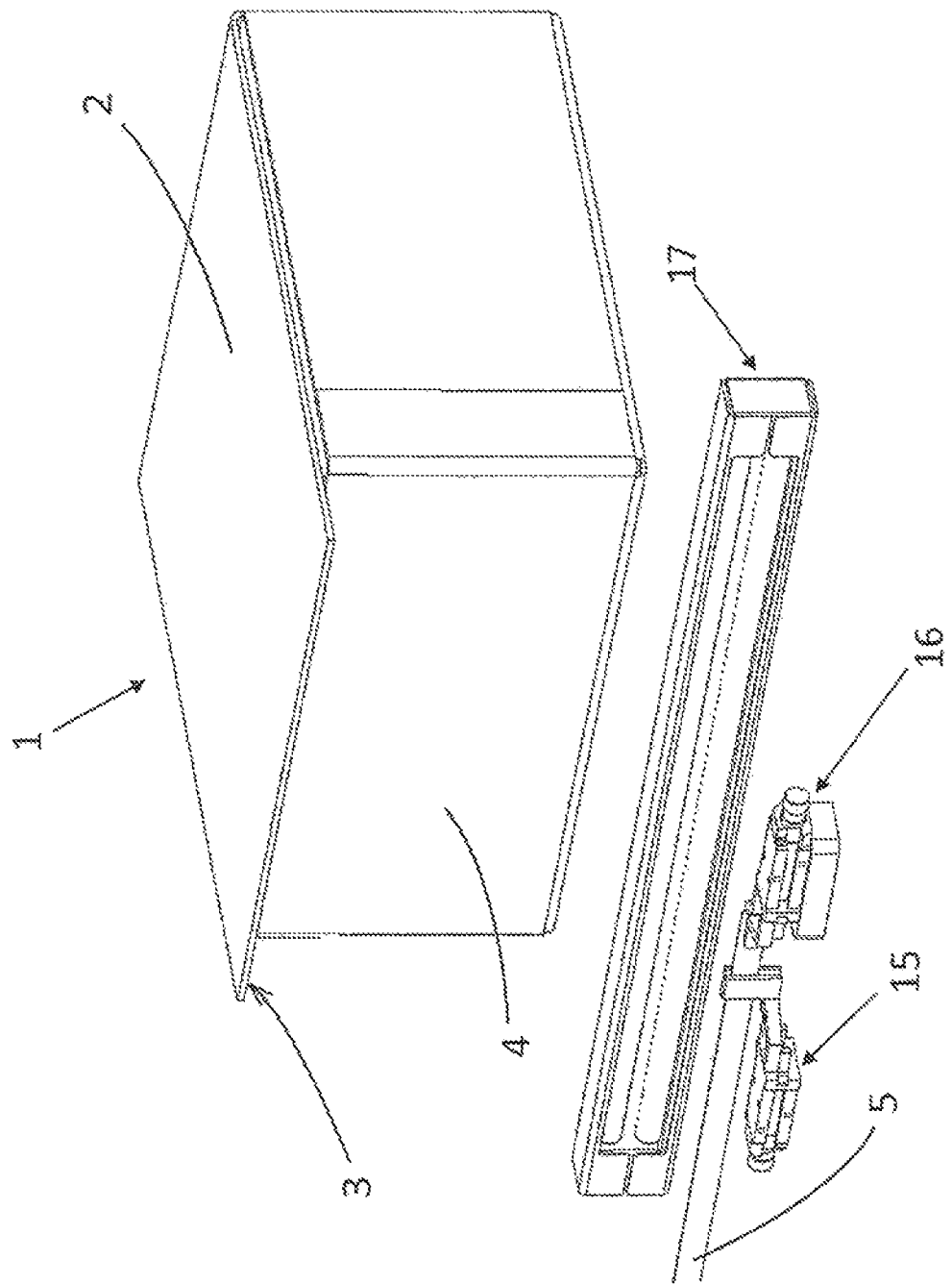

In FIG. 4B the second tape retainer 16 moves toward the first tape retainer 15 and retains a portion of the tape 5 that extends from the first tape retainer 15. The tape 5 thus is simultaneously retained by the first tape retainer 15 and the second tape retainer 16.

Figure 4C:
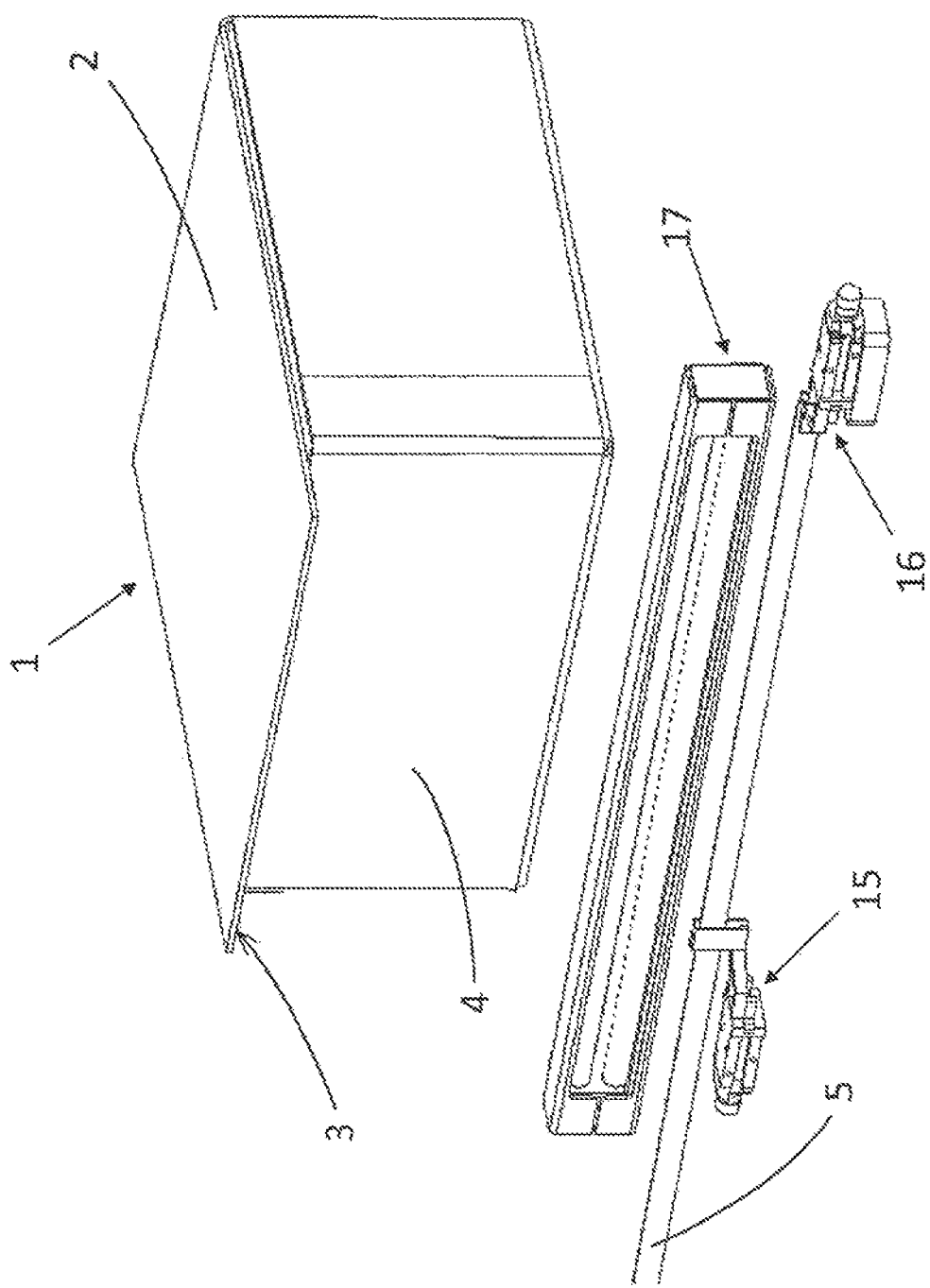

In FIG. 4C the first tape retainer 15 release the tape 5 and the second tape retainer 16 moves thereby pulling the tape 5 from the tape source to a predetermined tape length and position.

Figure 4D:
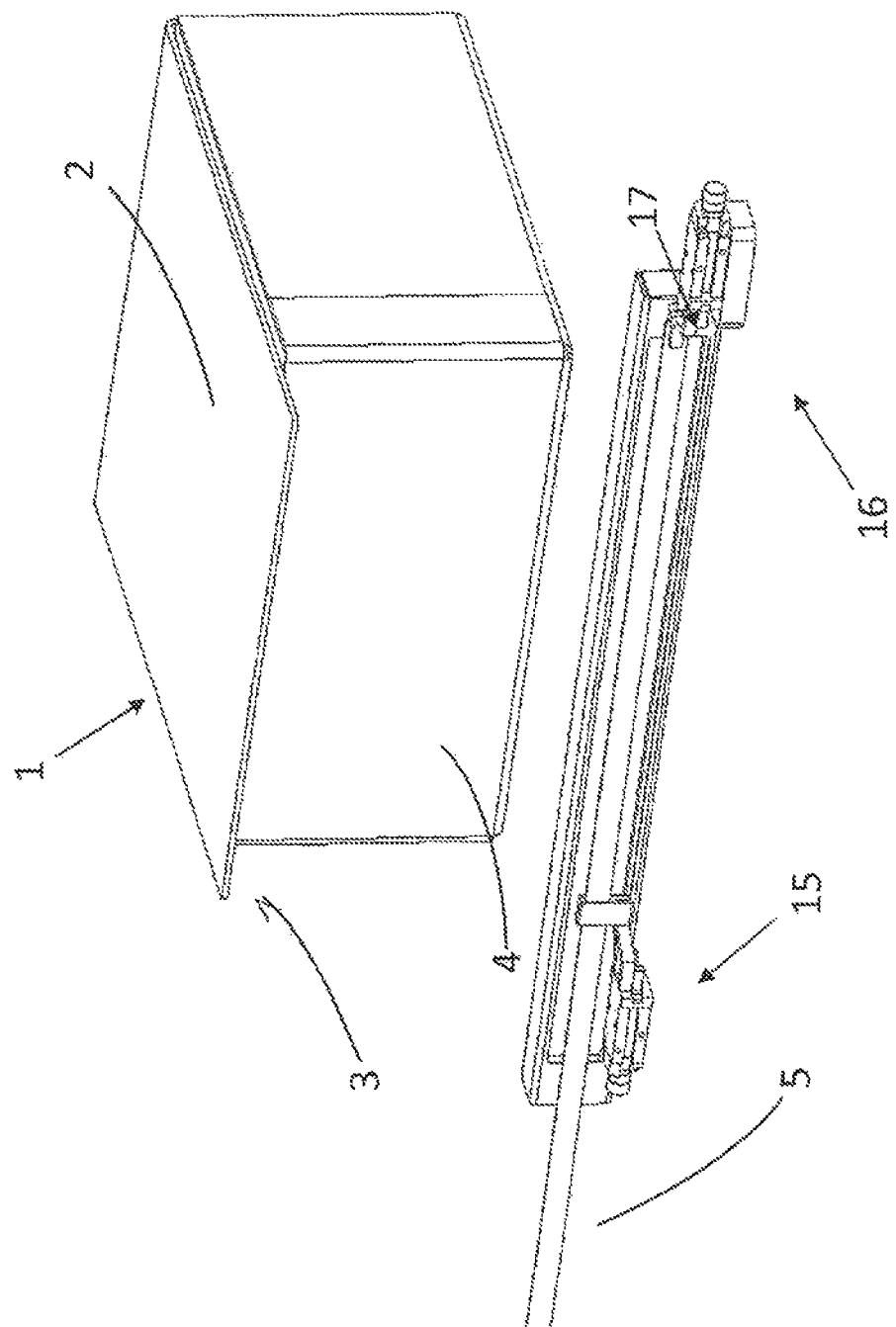

In FIG. 4D the first tape retainer 15 and the second tape retainer 16 move so as to translate the tape 5 across the activation source 17 to activate the activatable adhesive composition without melting the tape. Alternatively, the activation source 17 can move to be proximate to the length of tape 5 while the first tape retainer 15 and the second tape retainer 16 remain stationary.

Figure 4E:
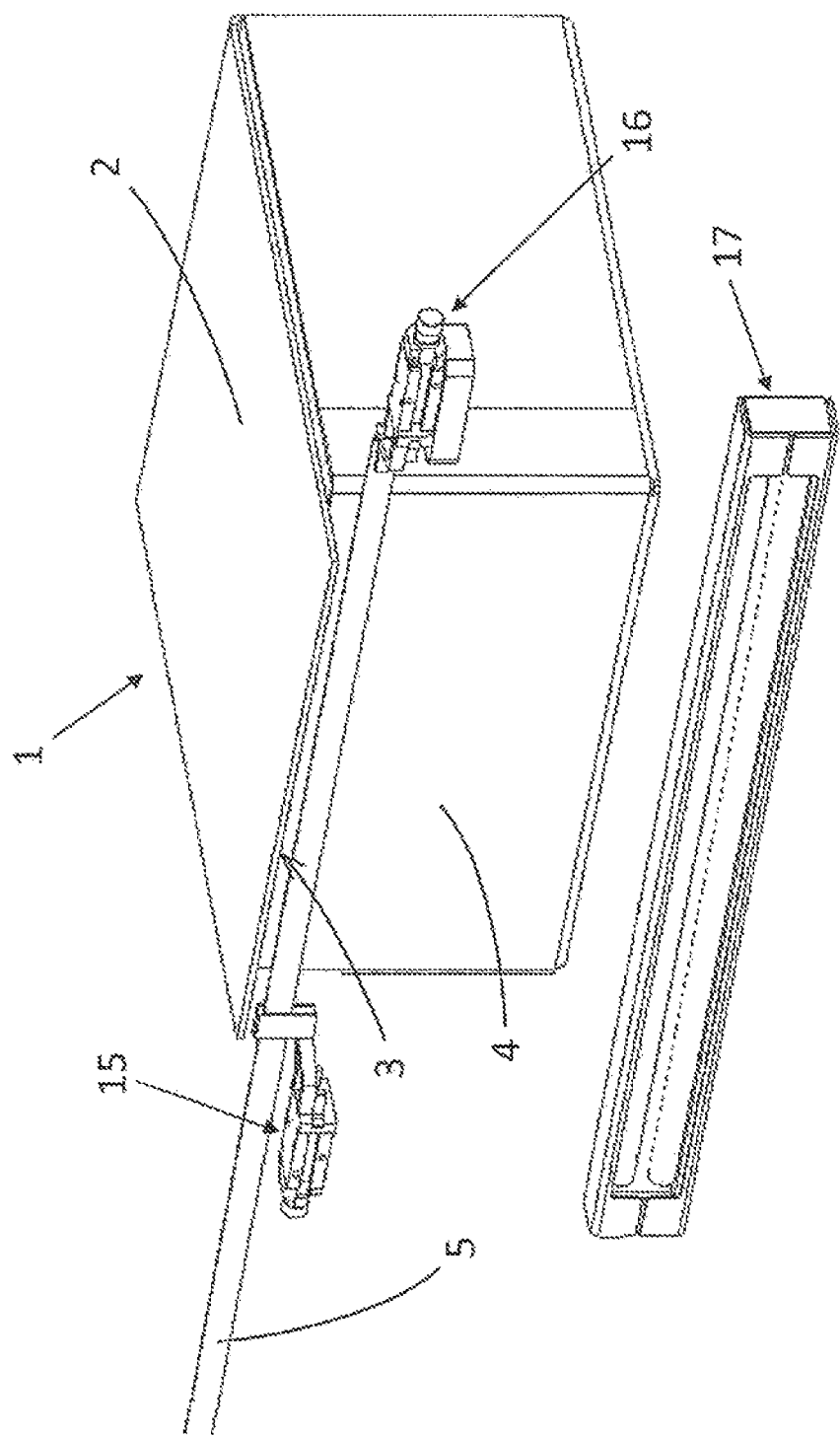

In FIG. 4E the first tape retainer 15 and the second tape retainer 16 continue to translate the tape 5 into a position on the exterior surface of the panel 4 at a location wherein the overlapping flap 3 will eventually contact the exterior surface of the panel 4.

Figure 4F:
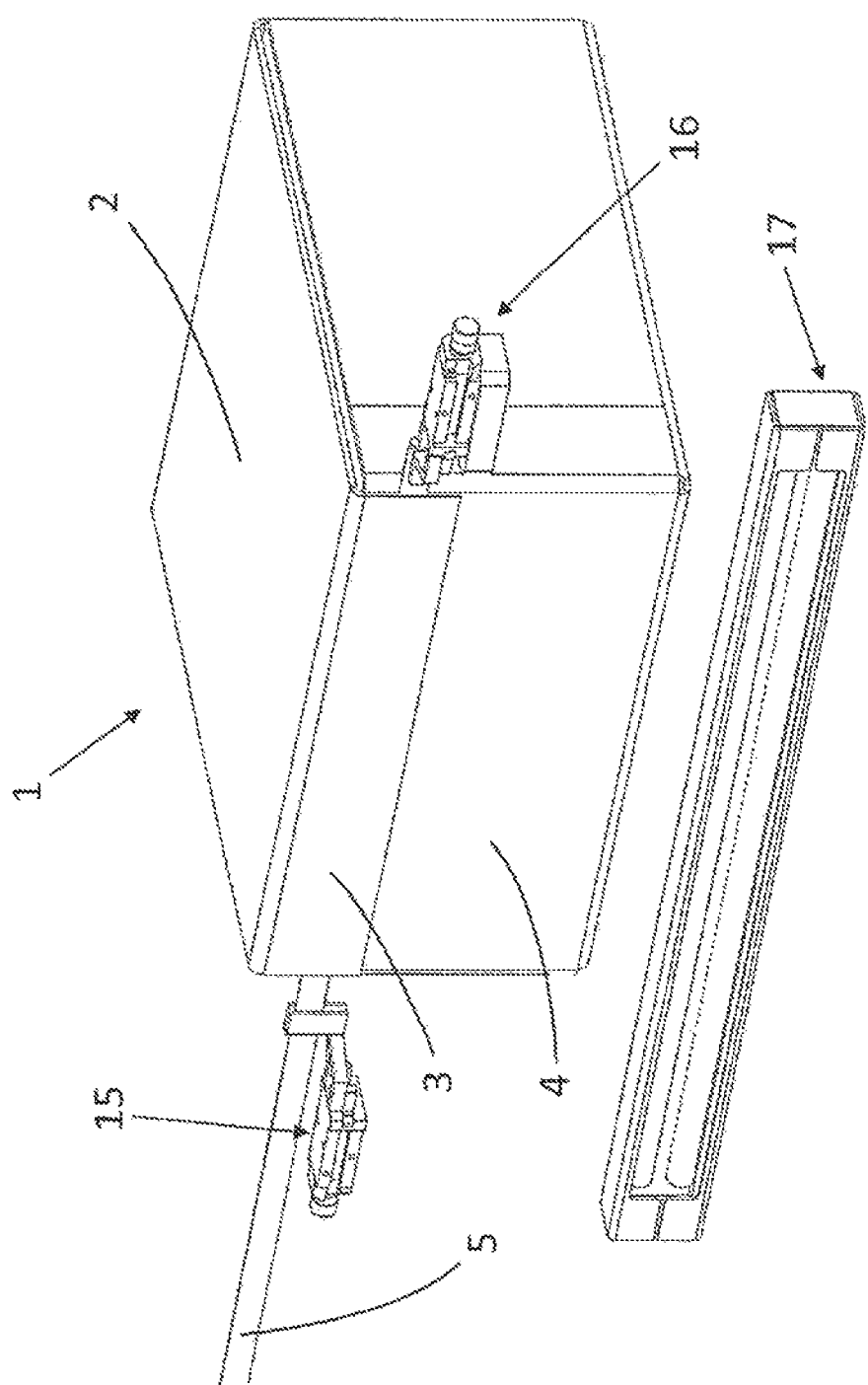

In FIG. 4F the flap 3 is bent and closed over the panel 4 and held by pressure until the adhesive composition on the tape sets to bond the flap 3 and the exterior surface of the panel 4 together. The first tape retainer 15 closes thus retaining the tape and the second tape retainer 16 is opened. The tape 5 is cut adjacent to first retainer 15.

Figure 4G:
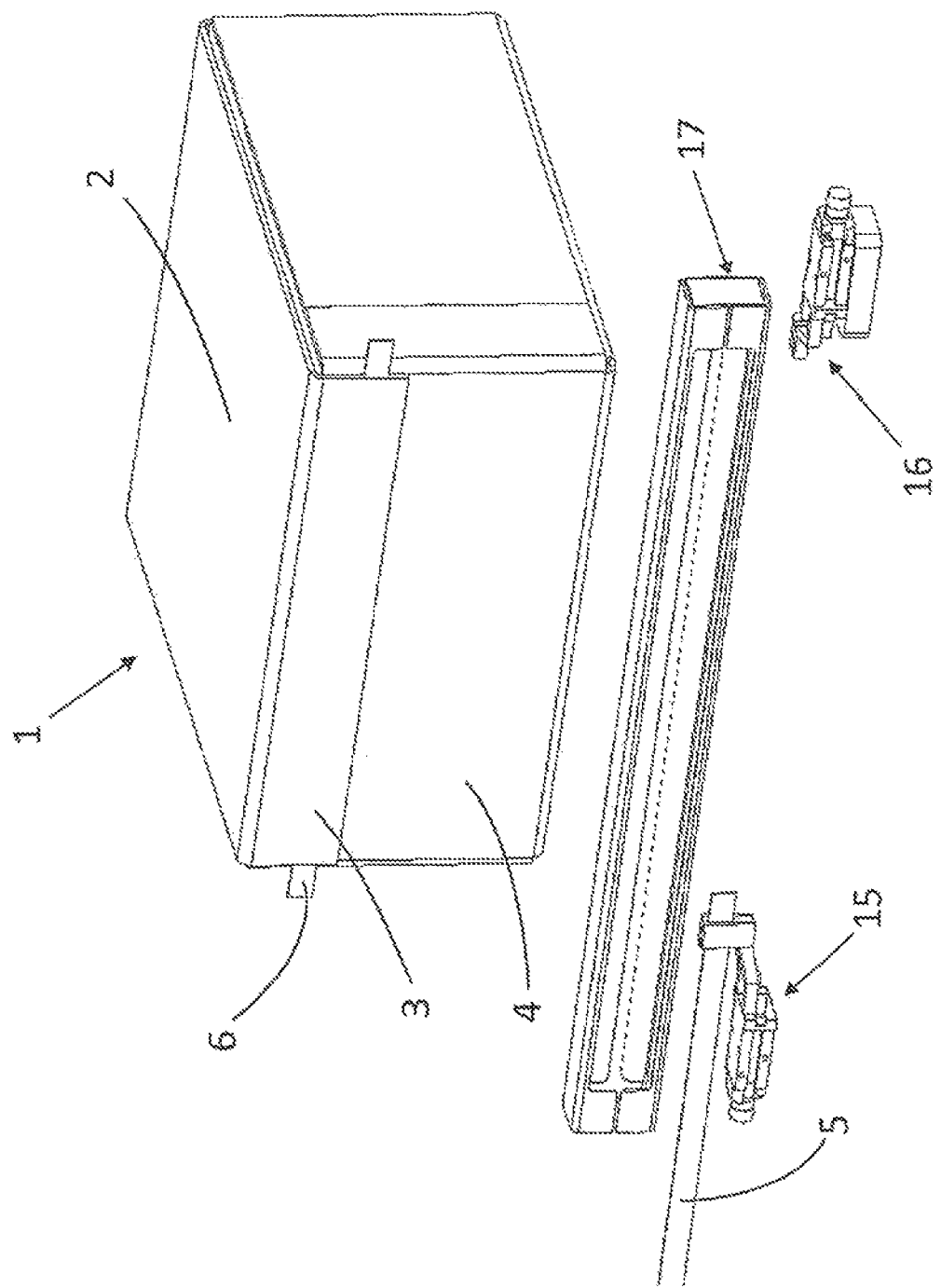

In FIG. 4G the first tape retainer 15 and the second tape retainer 16 retract to the start position shown in FIG. 4A.

Figure 7B:
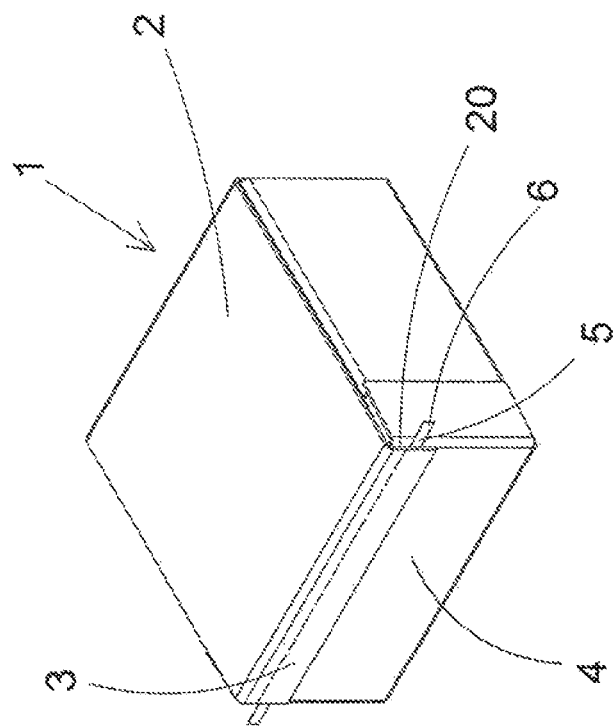
FIGS. 7A and 7B are perspective views of an embodiment that includes a second tape for re-closing the container after the container is opened.
Figure 7A:
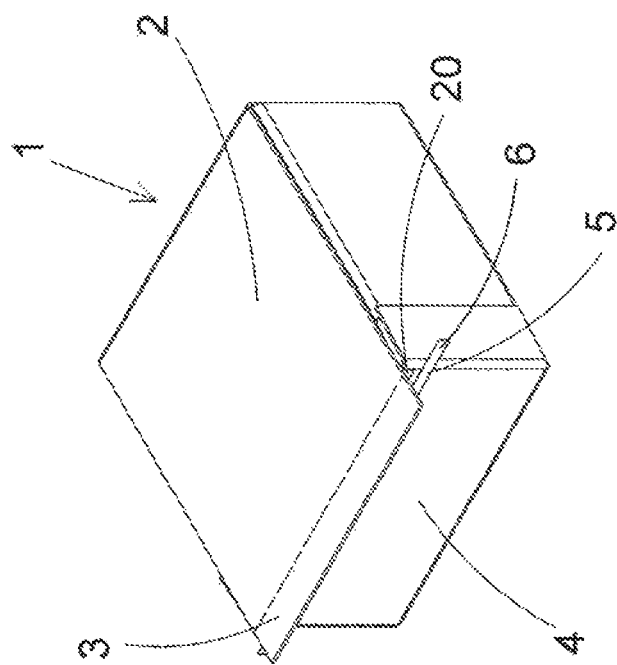
Figure 8A:
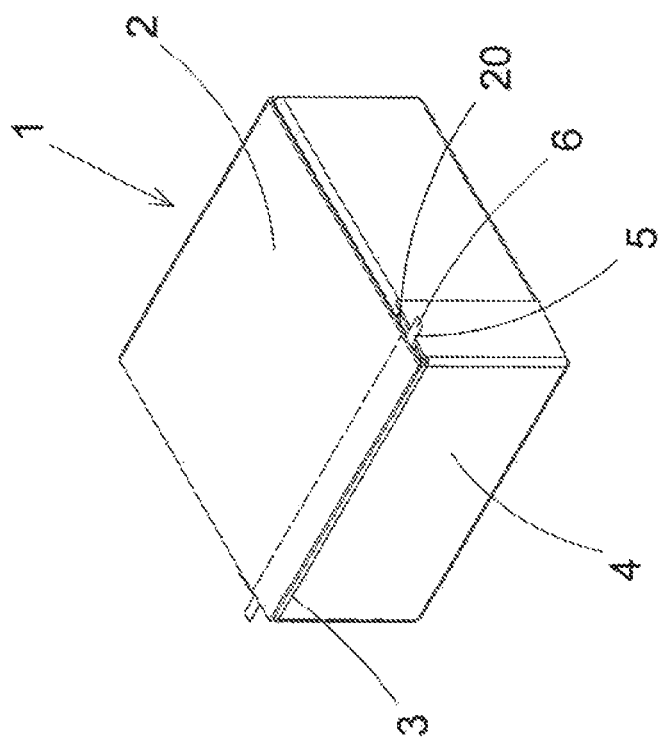
FIGS. 8A and 8B are perspective views of another embodiment that includes a second tape for re-closing the container after the container is opened.
Figure 8B:
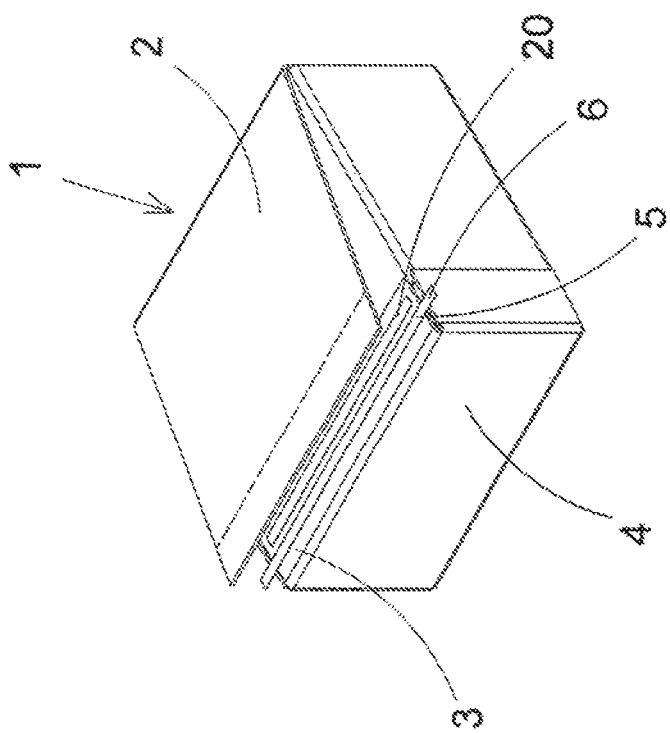

In certain embodiments, a second tape in addition to the activatable tape may be provided to re-close the container after the container has been initially opened. FIGS. 7A and 7B, and 8A and 8B, depict illustrative embodiments of the location of the second tape 20. In FIGS. 7A and 7B the tape 20 is positioned between the side panel 4 and the opening/closing flap 3. The tape 20 is also positioned between (i.e., above) the activatable tape 5 and the opening/closing flap 3 so that tape 20 resides between the side panel 4 and a remainder portion of the opening/closing flap 3 if a portion of the opening/closing flap 3 is torn off during opening of the container via the tape 5. As shown in FIGS. 7A and 7B a perforated line may be provided in opening/closing flap 3 to facilitate tearing open the container such that a portion of the opening/closing flap 3 is retained for re-closing with tape 20. In FIGS. 8A and 8B the tape 20 is positioned between the second opening/closing flap 3 and the first opening/closing flap 2. The tape 20 is also position inward (i.e., toward the interior volume of the container) relative to the location of tape 5 so that tape 20 resides between the second opening/closing flap 3 and a remainder portion of the first opening/closing flap 2 if a portion of the opening/closing flap 2 is torn off during opening of the container via the tape 5. As shown in FIGS. 8A and 8B a perforated line may be provided in opening/closing flap 3 to facilitate tearing open the container such that a portion of the opening/closing flap 3 is retained for re-closing with tape 20.

The second tape defines a first surface facing the interior portion of the container (i.e., side 4 or second opening/closing flap 3) and an opposing second surface facing the exterior portion of the container (i.e., opening/closing flap 3 or first opening/closing flap 2).

In certain embodiments the second tape includes a pressure sensitive adhesive on at least the second surface of the tape. The container can be re-closed by contacting the opened flap against the pressure sensitive adhesive. The pressure sensitive adhesive surface of the tape may also be provided with a removable release liner that covers the pressure sensitive adhesive until re-closing of the container is desired. In certain embodiments, the second tape is a layer of pressure sensitive adhesive with a release liner on top of the pressure sensitive adhesive (no carrier tape is required in this embodiment.

In certain embodiments the second tape may be adhered to the interior portion of the container (i.e., side 4 or second opening/closing flap 3) via an adhesive provided on the first surface of the second tape. The adhesive may be a pressure sensitive adhesive or a hot melt adhesive. The second tape may be applied at a different time compared to when the activatable tape is applied, or the second tape may be applied simultaneously with the activatable tape.

FIG. 9 depicts an illustrative moisture source for activating tape 5. Tape 5 is transported from, or held by, first retainer 15 to second retainer 16. The tape 5 between the first retainer 15 and the second retainer 16 contacts at least one wetted roller 21 (e.g., at a nip between two wetted rollers 21) or a wetted brush. The moisture-activated tape can then be applied to the container.

FIGS. 10A and 10B depict embodiments that include a shutter(s) 25 that can be interposed between the heat activator 17 and at least one of the tape 5 (or at least a portion of the tape 5), the first tape retainer 15, and the second tape retainer 16. Interposing the shutter(s) 25 between the heat activator and the tape 5 prevents premature tape activation. Interposing the shutter(s) 25 between at least one of the first tape retainer 15 and the second tape retainer 16 prevents premature activation of the tape 5 as the tape 5 traverses the retainers 15, 16. In FIG. 10A each of the shutters 25 are movable in the direction shown by the arrows for positioning as desired between the heat activator 17 and the retainers 15, 16. In FIG. 10B the shutter 25 is movable in the direction shown by the arrows for positioning in front of the heat activator 17 when on standby and for moving away from the heat activator 17 when tape activation is desired.

Certain embodiments are described in the numbered paragraphs below:

1. An automated method for sealing a paper board container, comprising:

(a) providing a paper board article having at least one paper board side panel and at least one paper board end panel, wherein there is at least one paper board opening/closing flap contiguous with the at least one end panel;

(b)(1) activating a single tape comprising a carrier substrate having a first surface and an opposing second surface, a first activatable adhesive composition disposed on the carrier substrate first surface and a second activatable adhesive composition disposed on the carrier substrate second surface, and contacting the activated tape to a surface of the paper board side panel or to a surface of the paper board opening/closing flap; or (b)(2) contacting a single tape to a surface of the paper board side panel or to a surface of the paper board opening/closing flap, the tape comprising a carrier substrate having a first surface and an opposing second surface, a first activatable adhesive composition disposed on the carrier substrate first surface and a second activatable adhesive composition disposed on the carrier substrate second surface, and then activating the tape; and (c) contacting a surface of the paper board side panel against a surface of the paper board opening/closing flap so the activated tape forms a bond in a single operation between the surface of the paper board side panel and the surface of the paper board opening/closing flap.

2. An automated method for sealing a paper board container, comprising:

(a)(2) providing a paper board article having at least one paper board end first opening/closing flap and at least one paper board side panel, wherein there is a second paper board opening/closing flap contiguous with the at least one side panel;

(b)(1) activating a single tape comprising a carrier substrate having a first surface and an opposing second surface, a first activatable adhesive composition disposed on the carrier substrate first surface and a second activatable adhesive composition disposed on the carrier substrate second surface, and contacting the activated tape to a surface of the second paper board opening/closing flap; or (b)(2) contacting a single tape to a surface of the second paper board opening/closing flap, the tape comprising a carrier substrate having a first surface and an opposing second surface, a first activatable adhesive composition disposed on the carrier substrate first surface and a second activatable adhesive composition disposed on the carrier substrate second surface, and then activating the tape; and (c) contacting a surface of the second paper board opening/closing flap against a surface of the first paper board opening/closing flap so the activated tape forms a bond in a single operation between the surface of the first paper board opening/closing flap and the surface of the second paper board opening/closing flap.

3. The method of paragraph 2, wherein activating the tape comprises exposing the tape to an activation source.

4. The method of paragraph 3, wherein the activation source is a heat source.

5. The method of any one of paragraphs 1 to 4, wherein the tape is activated prior to positioning the activated tape into a desired location proximate to the surface of the paper board side panel or to the surface of the paper board opening/closing flap.

6. The method of any one of paragraphs 1 to 5, wherein the tape does not include a removable release liner.

7. The method of any one of paragraphs 1 to 6, comprising dispensing the tape from a tape source, inserting the tape into a first retainer, inserting the tape into a second retainer, releasing the tape from the first retainer, pulling the tape to a predetermined length, exposing the tape length to the activation source, moving the activated tape into a desired location proximate to the surface of the paper board side panel or to the surface of the paper board opening/closing flap, closing the opening/closing flap so that the activated tape is between the paper board side panel and the opening/closing flap, and holding the opening/closing flap against the tape until the activated tape forms the bond between the surface of the paper board side panel and the surface of the paper board opening/closing flap.

8. The method of any of paragraphs 1 to 7, wherein first activatable adhesive composition and the second activatable adhesive composition are each a heat-activatable adhesive.

9. The method of paragraph 8, wherein the heat-activated adhesive comprises a hot melt adhesive.

10. The method of any one of paragraphs 1 to 9, wherein the tape includes at least one opening tab.

11. The method of any one of paragraphs 1 to 10, wherein the set bond strength of the first adhesive composition to the at least one side panel does not substantially exceed the strength of the internal bond strength of the paper board of the at least one side panel.

12. The method of any one of paragraphs 1 to 11, wherein the first activatable adhesive composition is disposed on the entire surface area of the carrier substrate first surface and the second activatable adhesive composition is disposed on the entire surface area of the carrier substrate second surface.

13. The method of any one of paragraphs 1 to 12, wherein the first activatable adhesive composition is disposed on only a portion of the surface area of the carrier substrate first surface and the second activatable adhesive composition is disposed on only a portion of the surface area of the carrier substrate second surface.

14. The method of any one of paragraphs 1 to 13, wherein the paper board is a corrugated paper board.

15. An article comprising:

at least one paper board side panel and at least one paper board end panel, wherein there is at least one paper board opening/closing flap contiguous with the at least one end panel; and a single tape comprising a carrier substrate having a first surface and an opposing second surface, a first activated adhesive composition disposed on the carrier substrate first surface and a second activated adhesive composition disposed on the carrier substrate second surface, wherein the tape is positioned between the at least one side panel and the opening/closing flap such that the first activated adhesive composition is adhesively secured to the at least one side panel and the second activated adhesive composition is adhesively secured to the folded opening/closing flap so as to form a seal between the side panel and the opening/closing flap, and wherein the set bond strength of the first adhesive composition to the at least one side panel does not substantially exceed the strength of the internal bond strength of the paper board of the at least one side panel.

16. The article of paragraph 15, wherein the first activated adhesive composition and the second activated adhesive composition are each a heat-activated adhesive.

17. The article of paragraph 16, wherein the heat-activated adhesive comprises a hot melt adhesive.

18. The article of any one of paragraphs 15 to 17, wherein the tape includes at least one opening tab.

19. The article of any one of paragraphs 15 to 18, wherein the article is a box that has four side panels, a top end panel, and a bottom end panel, wherein the tape is positioned on only one of the side panels.

20. The article of any one of paragraphs 15 to 19, wherein the article is a box that has four side panels, a top end panel, and a bottom end panel, wherein the tape is positioned on at least two of the side panels.

21. The article of any one of paragraphs 15 to 20, wherein the first activatable adhesive composition is disposed on the entire surface area of the first surface and the second activatable adhesive composition is disposed on the entire surface area of the second surface.

22. The article of any one of paragraphs 15 to 20, wherein the first activatable adhesive composition is disposed on only a portion of the surface area of the first surface and the second activatable adhesive composition is disposed on only a portion of the surface area of the second surface.

23. The article of any one of paragraphs 15 to 22, wherein the paper board is corrugated paper board.

24. A system comprising:
a tape dispensing source;
a moveable first retainer positioned to receive tape from the dispensing source;
a moveable second retainer aligned with the first retainer for receiving tape from the first retainer;
a tape activation source configured so that the first retainer and the second retainer can be positioned proximate to the tape activation source; and
a platform configured to hold an article, wherein the article includes at least one paper board side panel and at least one paper board end panel, and wherein there is at least one paper board opening/closing flap contiguous with the at least one end panel,
wherein the first retainer and the second retainer are located relative to the platform so that an activated tape held by the first retainer and the second retainer can be applied to the at least one paper board side panel or to the at least one paper board opening/closing flap.

25. The system of paragraph 24, wherein the tape activation source is a heat source.

26. The system of paragraph 24 or 25, wherein the first retainer and the second retainer are each independently a mechanical gripper.

In view of the many possible embodiments to which the principles of the disclosed invention may be applied, it should be recognized that the illustrated embodiments are only examples of the invention and should not be taken as limiting the scope of the invention.

What is claimed is:

1. A method of sealing a container, the method comprising:
activating a tape comprising a carrier substrate having a first surface, an opposing second surface, a first activatable adhesive composition disposed on the carrier substrate first surface, and a second activatable adhesive composition disposed on the carrier substrate second surface;
contacting the activated tape to at least one of a surface of a side panel and a surface of an opening/closing flap of an article, the article having at least one side panel, at least one end panel, and at least one opening/closing flap contiguous with the end panel; and
contacting a surface of the side panel against a surface of the opening/closing flap such that the activated tape forms a bond between the surface of the side panel and the surface of the opening/closing flap of the article,
wherein activating the tape comprises activating the first activatable adhesive composition and the second activatable adhesive composition with a first activation source.

2. The method of claim 1, wherein activating the tape comprises exposing the tape to an activation source at the same physical space where the tape is contacted to the at least one of the surface of the side panel and the surface of the opening/closing flap of the article.

3. The method of claim 2, wherein the activation source is a heat source.

4. The method of claim 2, wherein the activation source is a moisture source.

5. The method of claim 1, wherein the tape is activated prior to positioning the tape on at least one of the surface of the side panel and the surface of the opening/closing flap of the article.

6. The method of claim 1, wherein the first activatable adhesive composition and the second activatable adhesive composition are the same adhesive composition.

7. The method of claim 1, further comprising
dispensing the tape from a tape source,
inserting the tape into a first retainer,
inserting the tape into a second retainer,
releasing the tape from the first retainer,
pulling the tape to a predetermined length with the second retainer,
exposing the tape length to the activation source to form an activated tape,
contacting the activated tape to at least one of the surface of the side panel and the surface of the opening/closing flap of the article,
contacting the surface of the side panel against the surface of the opening/closing flap so that the activated tape is between the side panel and the opening/closing flap, and holding the opening/closing flap against the activated tape until the activated tape forms a bond between the surface of the side panel and the surface of the opening/closing flap.

8. The method of claim 1, wherein the first activatable adhesive composition and the second activatable adhesive composition are each a heat-activatable adhesive.

9. The method of claim 8, wherein the heat-activatable adhesive comprises a hot melt adhesive.

10. The method of claim 1, wherein the first activatable adhesive composition and the second activatable adhesive composition are each a moisture-activatable adhesive.

11. The method of claim 1, wherein the tape includes at least one opening tab.

12. The method of claim 1, wherein the article is a paper board container.

13. The method of claim 12, wherein a set bond strength of the first adhesive composition to at least one of the surface of the side panel and the surface of the opening/closing flap of the article does not substantially exceed an internal bond strength of the paper board of the at least one side panel.

14. The method of claim 1, wherein activating the tape comprises exposing the first activatable adhesive composition and the second activatable adhesive composition to the same method of activation.

15. The method of claim 1, wherein the first activatable adhesive composition is disposed on the entire surface area of the carrier substrate first surface and the second activatable adhesive composition is disposed on the entire surface area of the carrier substrate second surface.

16. The method of claim 1, wherein the first activatable adhesive composition is disposed on only a portion of the surface area of the carrier substrate first surface and the second activatable adhesive composition is disposed on only a portion of the surface area of the carrier substrate second surface.

17. The method of claim 1, wherein activating the tape comprises exposing both the first activatable adhesive composition and the second activatable adhesive composition to the first activation source at the same time.

18. The method of claim 1, further comprising positioning a second tape between the surface of the side panel and the surface of the opening/closing flap.

19. An article comprising:
at least one paper board side panel and at least one paper board end panel, and at least one paper board opening/closing flap contiguous with the at least one end panel; and
a tape comprising a carrier substrate having a first surface and an opposing second surface, a first activated adhesive composition disposed on the carrier substrate first surface and a second activated adhesive composition disposed on the carrier substrate second surface, wherein the tape is positioned between the at least one side panel and the opening/closing flap such that the first activated adhesive composition is adhesively secured to the at least one side panel and the second activated adhesive composition is adhesively secured to the folded opening/closing flap so as to form a seal between the side panel and the opening/closing flap, and wherein both the first activated adhesive composition and second activated adhesive composition are activatable with a first surface activation source.

20. The article of claim 19, wherein the tape is an opening/closing tape.

* * * * *